United States Patent
Kojori et al.

(10) Patent No.: US 8,384,343 B2
(45) Date of Patent: Feb. 26, 2013

(54) ELECTRIC ACCUMULATORS HAVING SELF REGULATED BATTERY WITH INTEGRATED BI-DIRECTIONAL POWER MANAGEMENT AND PROTECTION

(75) Inventors: Hassan Ali Kojori, Mississauga (CA); David Lazarovich, Thornhill (CA); Harmohan N. Singh, Rockaway Township, NJ (US)

(73) Assignee: Honeywell International Inc., Morristown, NJ (US)

( * ) Notice: Subject to any disclaimer, the term of this patent is extended or adjusted under 35 U.S.C. 154(b) by 458 days.

(21) Appl. No.: 12/768,011

(22) Filed: Apr. 27, 2010

(65) Prior Publication Data

US 2011/0260690 A1    Oct. 27, 2011

(51) Int. Cl.
 *H02J 7/14* (2006.01)
 *B60L 1/00* (2006.01)
 *H02J 3/00* (2006.01)

(52) U.S. Cl. ........ 320/104; 320/132; 320/134; 320/136; 307/9.1; 307/10.1; 307/11; 307/19; 307/20

(58) Field of Classification Search ............... 320/104
See application file for complete search history.

(56) References Cited

U.S. PATENT DOCUMENTS

| | | | |
|---|---|---|---|
| 5,373,195 A | | 12/1994 | De Doncker et al. |
| 5,821,729 A | | 10/1998 | Schmidt et al. |
| 5,955,865 A | * | 9/1999 | Koike et al. ............... 320/104 |
| 6,608,396 B2 | * | 8/2003 | Downer et al. ............ 290/40 C |
| 6,873,134 B2 | | 3/2005 | Canter et al. |
| 2008/0100135 A1 | * | 5/2008 | Lazarovich et al. .......... 307/9.1 |

* cited by examiner

*Primary Examiner* — Edward Tso
*Assistant Examiner* — Ahmed Omar
(74) *Attorney, Agent, or Firm* — Shimokaji & Assoc., PC

(57) ABSTRACT

A power management system may comprise a generative power source, a main bus between the generative power source and electrical loads, a energy accumulator and a main bi directional power converter interposed between the main bus and the energy accumulator unit. The energy accumulator may comprise a plurality of energy storage blocks. The energy storage blocks may individually comprise energy storage units and control units with dedicated DC/DC bidirectional power converters.

16 Claims, 4 Drawing Sheets

ELECTRIC ACCUMULATORS HAVING SELF REGULATED BATTERY WITH INTEGRATED BI-DIRECTIONAL POWER MANAGEMENT AND PROTECTION

BACKGROUND OF THE INVENTION

The present invention generally relates to electrical energy management systems. More particularly, the invention relates to energy accumulation systems for use in conjunction with generative power sources.

Due to developments in power electronics and an increase in the requirements for emergency and stored energy, higher voltages and power levels are required from batteries. Various electrical functions in aerospace and ground vehicles (tactical vehicles and automotive) may be performed with power systems which incorporate energy storage elements such as batteries supercapacitors and/or fuel cells. These applications may include aircraft APU and main engine start and ground vehicle traction drives. Energy accumulators may be employed for effective harnessing or mitigation of bidirectional flow of electric energy and improving overall efficiency.

Some large scale energy storage systems may also be employed to satisfy mobile power and distributed renewable applications for peak power shaving and/or effectively using stored energy to avoid high cost of electricity during higher rates imposed by smart metering. In many of these applications, elementary battery cells may be connected in series so that an output terminal voltage equals a sum of elementary voltages.

In addition, many newer systems may employ Li-ion batteries which consist of multiple cells in series. The number of cells in series increase with the increased battery voltage. Conventional Li-ion systems require charge/discharge control and equalization at the cell level which may require considerable electronics, particularly in case of the higher voltage batteries.

In such systems it is important to provide reliable output from the batteries. For example it is important to assure that degradation of any one cell (e.g. excessive capacity fading, voltage imbalance, open cell) does not lead to the failure of an entire system. In systems which require a large number of cells connected in series, the overall reliability of the system must be carefully managed.

As can be seen, there is a need for a power management system with an energy accumulator that has high reliability and is not subject to failure as a result of failure on any one particular cell in a battery pack. Additionally there is a need to lower the number of the cells used in higher voltage systems through use of boost converters.

SUMMARY OF THE INVENTION

In one aspect of the present invention, a power management system may comprise a generative power source; a main bus between the generative power source and electrical loads; an energy accumulator; and a main bi-directional power converter interposed between the main bus and the energy accumulator unit. The energy accumulator may comprise a plurality of energy storage blocks. The energy storage blocks may individually comprise energy storage units and control units with dedicated DC/DC bidirectional power converters.

In another aspect of the present invention, an accumulator for electrical energy may comprise an accumulator bus and a plurality of energy storage blocks. The energy storage blocks may comprise energy storage units and control units which may comprise DC/DC bidirectional converters. The energy storage blocks may be connected in parallel to the accumulator bus.

In still another aspect of the present invention, a method for operating a power management system may comprise the steps of: generating electrical power; supplying the generated power to a energy accumulator; allocating storage portions of the supplied power to one or more energy storage blocks of the accumulator; storing the allocated storage portions of supplied power in the energy storage blocks as stored energy; allocating discharging portions of the stored energy among one or more of the energy storage blocks; and discharging the allocated discharging portions of the stored energy to electrical loads.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides a power management system in which generative or regenerative power is applied to electrical loads and in which some energy may be accumulated for subsequent use for the electrical loads. The accumulation of energy may be performed with an accumulator that comprises a plurality of energy storage blocks connected in parallel to a power bus of the system. The energy storage blocks may deliver stored energy to the power system through dedicated boost convertes so that high output voltages may be achieved with a relatively low number of electrochemical cells.

Figure 1:
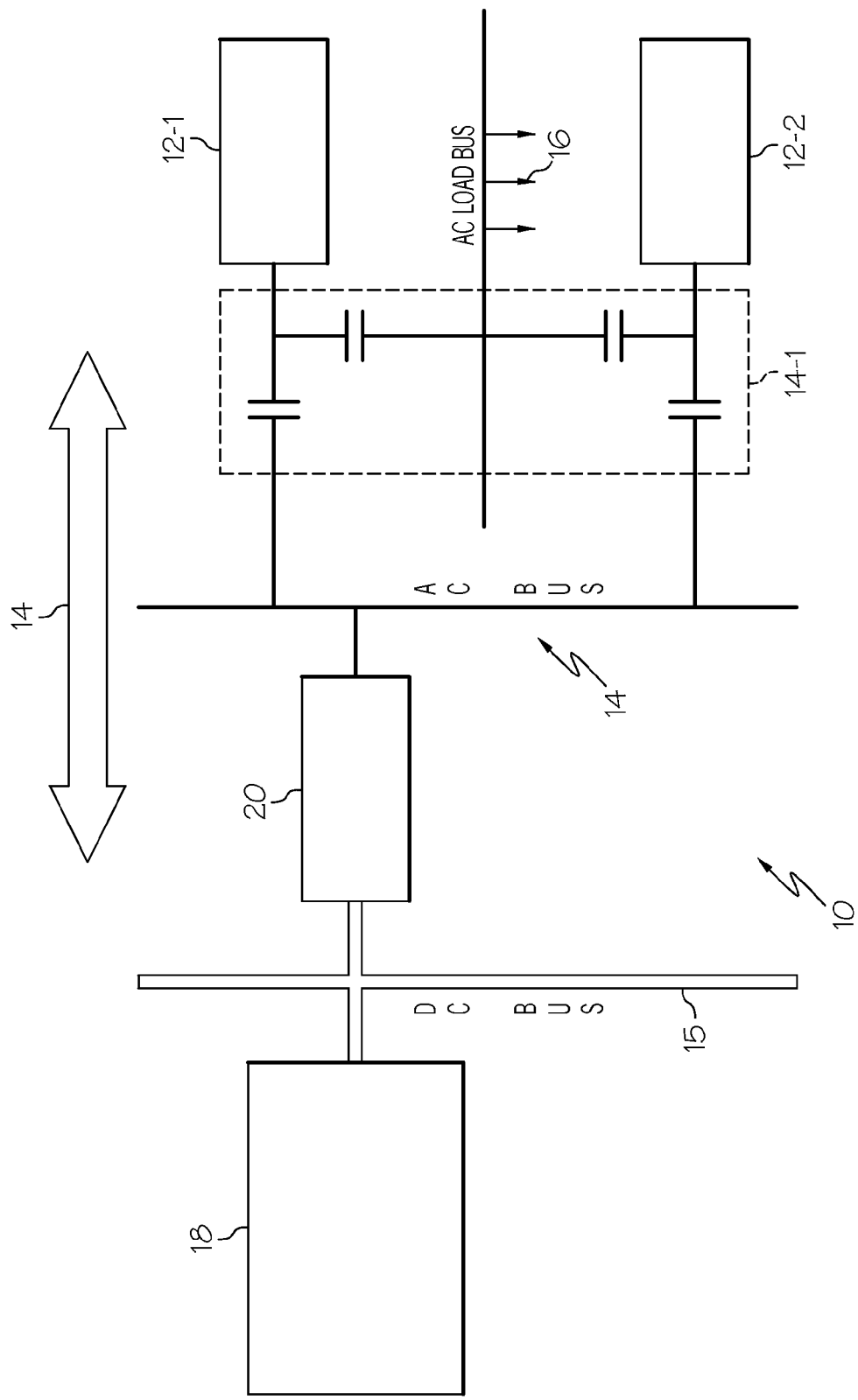
FIG. 1 is a block diagram of a power management system in accordance with an embodiment of the invention.

Referring now to FIG. 1, an exemplary embodiment of a power management system 10 is shown in block diagram form. The power system 10 may be one example of a system that may employ a novel energy accumulator 18. The system 10 may comprise AC power sources such as a main engine generator 12-1 and an auxiliary power unit (APU) generator 12-2 and regenerative power loads such as actuators on an AC load bus 16 (all of which may be referred to herein collectively as a power source 12). The system 10 may also comprise the main AC load bus 16, an energy accumulator 18 and a main bidirectional power converter or DC/AC bidirectional power converter 20. The DC/AC bidirectional power converter 20 may be interposed between an AC start bus 14 and a DC bus 15 which may be directly connected to an output of the energy accumulator 18. In operation, the system 10 may generate or regenerate power with the power sources 12.

Power may be transferred directly to the electrical loads on the AC bus 16. Power from the source 12 may also be directed to the DC/AC bidirectional power converter 20 through a contactor system 14-1. DC power may then be supplied to the energy accumulator 18. Conversely, power may flow from the energy accumulator 18 to the electrical loads 16 depending on the status of the contactor system 14-1.

The DC/AC power converter 20 may be provided with the capability of boosting output voltage of the accumulator 18. Additionally, as described hereinafter with respect to FIG. 2, individual energy storage blocks within the accumulator 18 may be provided with dedicated voltage boosters so that high voltage output may be produced with a relatively low number of cells.

Figure 2:
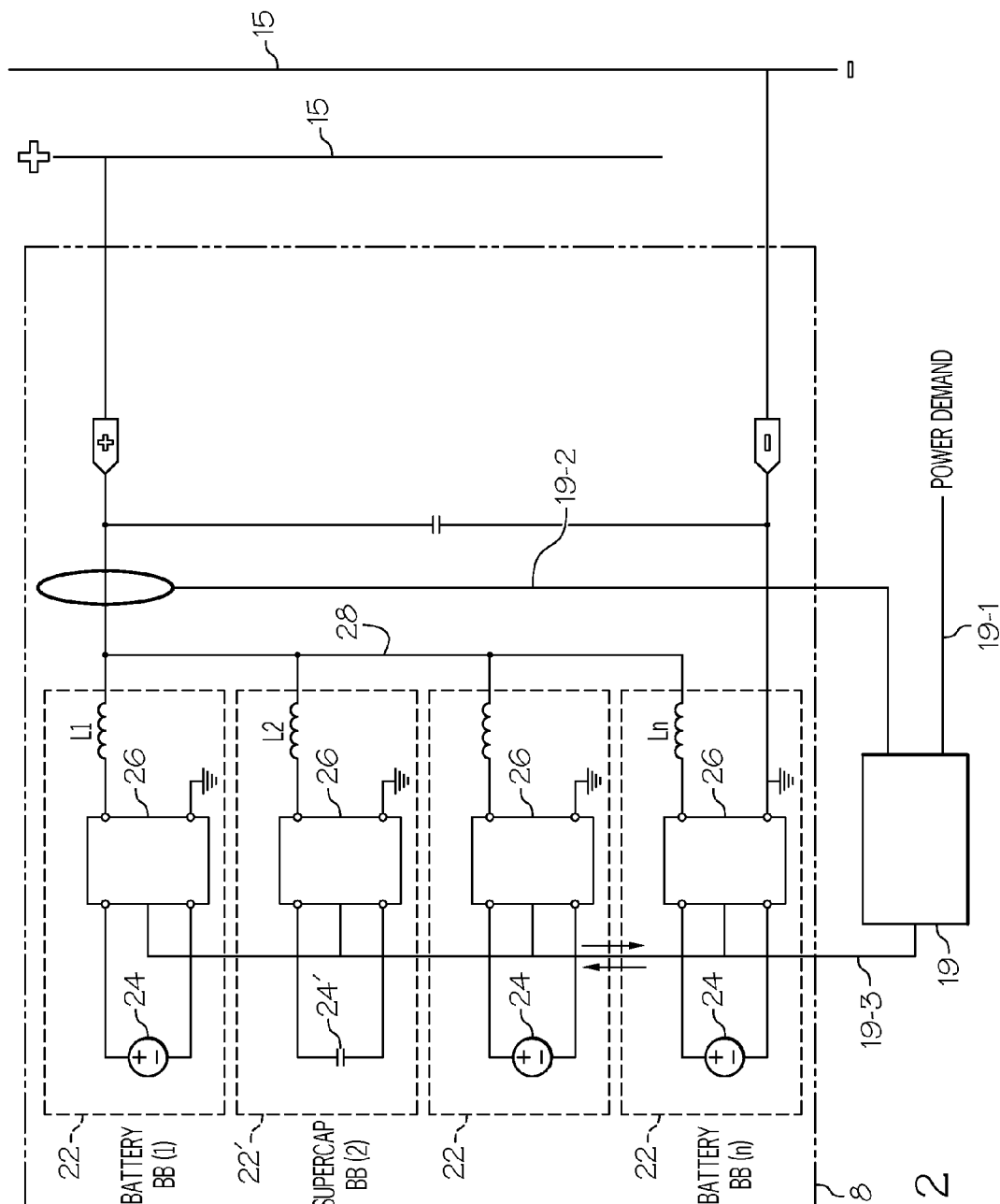
FIG. 2 is a block diagram of an energy accumulator in accordance with an embodiment of the invention.

Referring now to FIG. 2, the energy accumulator 18 is shown in block diagram form. The energy accumulator 18 may comprise a plurality of energy storage blocks 22 and 22' connected in parallel to an accumulator bus 28. Control units 26 may be provided in each of the energy storage blocks 22 and/or 22'. The control units 26, among other functions may provide voltage boost for energy storage units 24 and/or 24'. Thus, for example, in the case of one of the units 24 comprising a 7-cell Li-ion battery, the associated control unit 26 may boost output of the unit 24 to about 270 volts, even though the output voltage of the batteries may be only about 28 volts. Thus the number of batteries and, therefore the total number of cells for a 270 volt application may be reduced by an order of magnitude. This, correspondingly, reduces the number of electronic components that are required for cell overcharge/overdischarge monitoring and equalization.

The accumulator bus 28 may be connected to the DC bus 15 of the power management system 10. It may be seen that each of the energy storage blocks 22 may be separately grounded so that any one of the energy storage blocks 22 may be disconnected or inactivated independently from the other blocks 22 without changing the output voltage of the energy accumulator 18. Furthermore, as will be explained hereinafter, the energy accumulator 18 may, through use of a load controller 19, retain full operability in the event of deactivation of any one or more of the energy storage blocks 22 by rebalancing electrical load to the energy storage blocks 22 which may remain activated. Additionally the load controller 19 may incorporate embedded prognostics health management capabilities.

Figure 3:
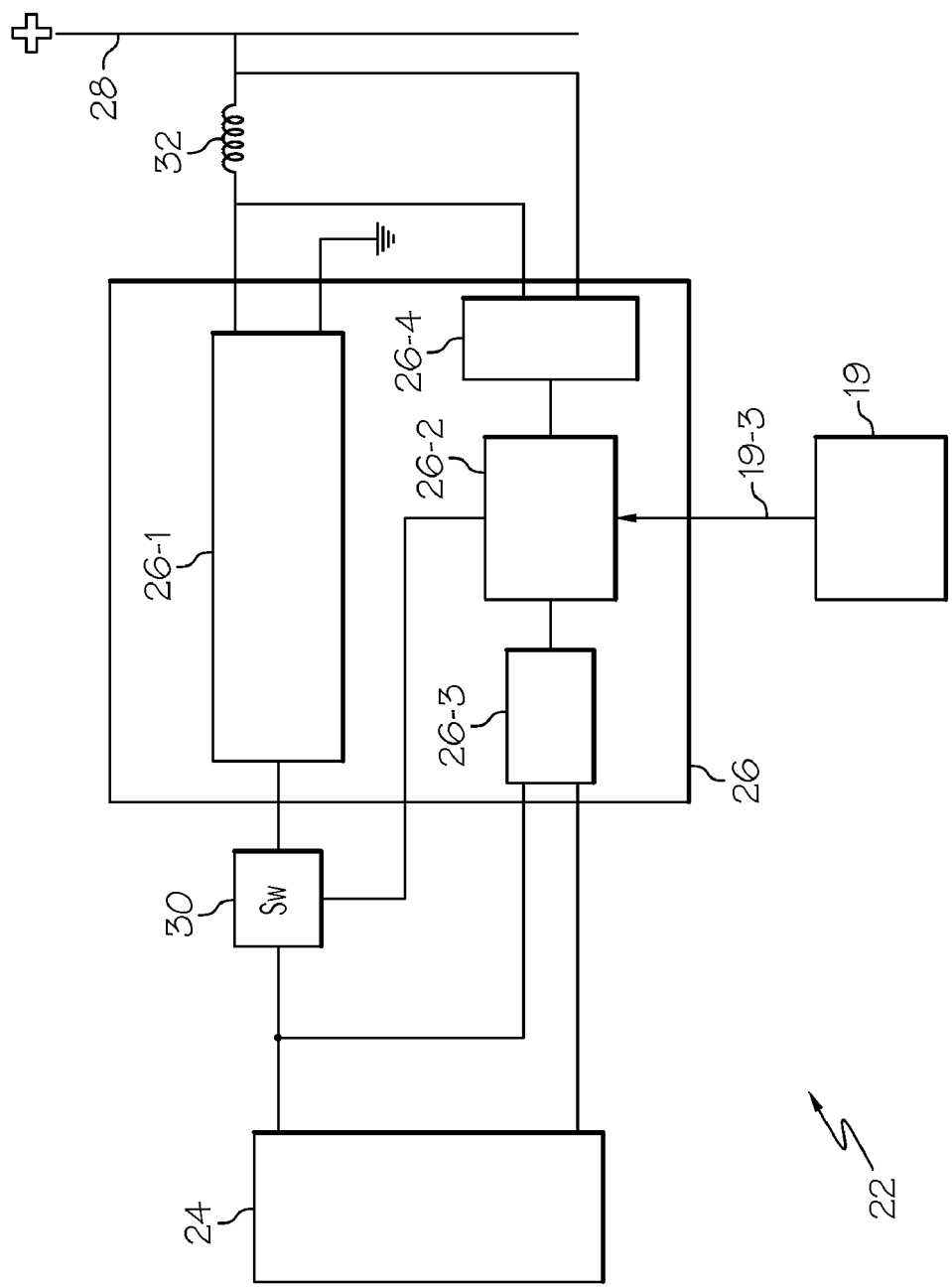
FIG. 3 is a block diagram of a energy storage unit in accordance with an embodiment of the invention.

Referring now to FIG. 3, one of the energy storage blocks 22 is shown in block diagram form. The energy storage block 22 may comprise an energy storage unit 24, the control unit 26, a switch 30 and an inductor 32. The control unit 26 may comprise a DC/DC bidirectional power converter 26-1, a switch controller 26-2, a voltage sensor 26-3 and a current sensor 26-4. The switch controller 26-2 may operate with pulse width modulation (PWM) signaling to control the switch 30. Power flowing to or from the energy storage unit 24 may have a voltage different from power supplied or accumulated by the energy accumulator 18.

The energy storage units 24 of the energy storage blocks 22 may be constructed with various exemplary configurations. One or more of the energy storage units 24 may comprise one or more batteries such lithium ion cells or lead-acid cells connected in series or in parallel. Alternatively, one or more of energy storage units 24' of energy storage blocks 22' may comprise a collection of supercapacitors. It may be advantageous to construct the energy accumulator 18 with a combination of battery based energy storage blocks 22 and supercapacitors-based energy storage blocks 22'. In such a configuration, supercapacitors-based energy storage blocks 22' may allow the energy accumulator 18 to effectively store regenerative power which may be rapidly delivered to the energy accumulator 18. Presence of the battery based-energy storage blocks 22 may allow the energy accumulator 18 to deliver power to the DC bus 28 over an extended period of time.

Referring now to FIGS. 2 and 3, effectiveness of a combined use of the blocks 22 and the blocks 22' may be understood when considering some operational features of the energy accumulator 18. The load controller 19 may be provided with a power demand signal 19-1 and a power output or input signal 19-2 which may be indicative of current output from the energy accumulator 18 to the DC bus 15 or power input to the energy accumulator 18. The load controller 19 may send and receive bidirectional load distribution signals 19-3 to and from the PWM switch controllers 26-2 of the energy storage blocks 22 and 22'. If one or more of the energy storage blocks 22 or 22' may have diminished output capacity, then the other ones of the energy storage blocks may be commanded by the load controller 19 to deliver power at an increased output rate to the accumulator bus 28.

In an exemplary series of operations, the energy accumulator 18 may be provided with a rapidly regenerated surge of power. The battery-based energy storage blocks 22 may not be able to absorb the surge, but the capacitor-based energy storage blocks 22' may effectively absorb and store the surge of power. In a later stage of operation, power may be drawn from the energy accumulator 18 over an extended period of time. The load controller 19 may command that the capacitor-based energy storage blocks 22' be discharged to meet the power demand. The power demand period may extend beyond the discharge time of the capacitor-based energy storage blocks 22'. In that event, the load controller 19 may be provided with signals 19-3 from the PWM switch controllers 26-2 of the energy storage blocks 22', advising that the energy storage blocks 22' have exhausted their charge. The load controller 19 may then allocate load requirements to the battery-based energy storage units 22 so that the load requirement may be met for a longer time period. In some exemplary systems the capacitor-based energy storage blocks 22' may remain engaged until high current power demands may be met.

Load requirements may also be re-allocated among the energy storage blocks 22 and 22' when and if one or more of the blocks may fail to operate properly because of any one of numerous conditions such as battery cell failure, capacity fade failure or other typical problems that may be related to battery health. Such re-allocation may be facilitated by constructing the control units 26 with dedicated voltage sensors 26-3 and dedicated current sensors 26-4. In operation, the voltage sensors 26-3 may detect output voltage from their respective storage units 24 or 24'. In the event of overvoltage resulting from overcharge or under voltage resulting from over-discharge, the PWM switch controller 26-2 may signal the switch 30 to disconnect the storage unit 24 or 24' from the energy storage block 22 or 22', thus disabling the storage block. In such an event, the load controller 19 may allocate the overall load requirements to those energy storage blocks 22 or 22' which may remain active. The current sensors 26-4 may be similarly employed to detect overcurrent that may result from overcharging or over-discharging (e.g. in the event of overvoltage failure of converter control) The current sensors 26-4 may advantageously detect current passing through the dedicated inductors 32 of the energy storage blocks 22 and/or 22'. In the event of overcurrent resulting from overcharge or over-discharge, the PWM switch controller 26-2 may respond to overvoltage and may signal the switch 30 to disconnect the storage unit 24 or 24' from the bidirectional DC/DC power converter 26-1 of the respective energy storage block 22 or 22', thus disabling the storage block. In such an event, the load controller 19 may allocate the overall load requirements to those energy storage blocks 22 or 22' which may remain active. Thus it may be seen that the bidirectional DC/DC power converter 26-1 of the respective energy storage block 22 or 22' may enhance operations of accumulator 18 in both a load mode and a charge mode.

Figure 4:
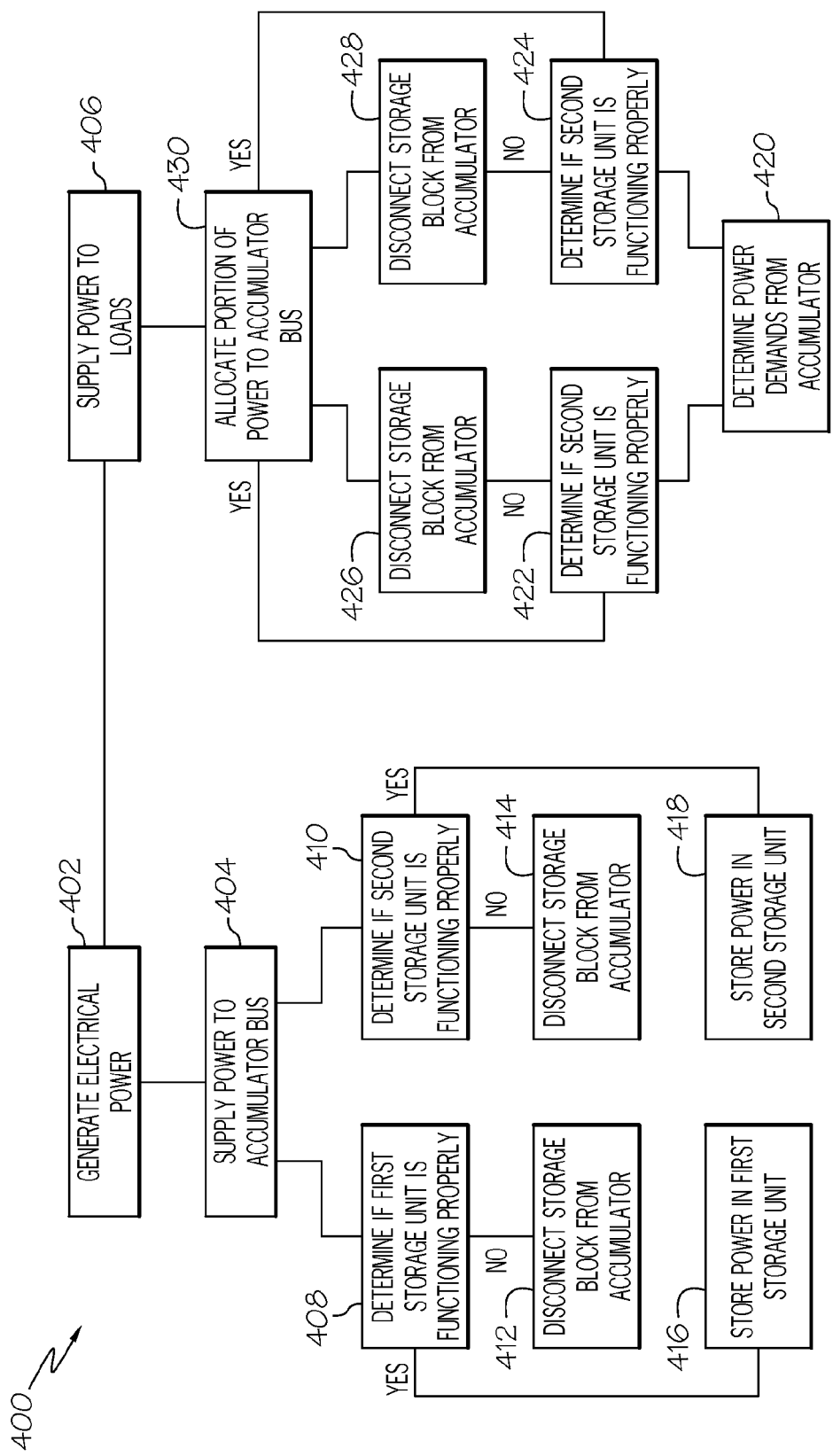
FIG. 4 is a flow chart of a method for managing electrical power in accordance with an embodiment of the invention.

Referring now to FIG. 4, a flow chart 400 may illustrate an exemplary method which may be employed to operate the power management system 10 in accordance with an embodiment the invention. In a step 402, electrical power may be generated or regenerated (e.g., the power source 12 may produce electrical power). In steps 404 and 406, the electrical power from step 402 may be provided to a energy accumulator and electrical loads (e.g., the power source 12 may provide power to the AC bus 14 which may conduct the power to the electrical loads 16 and to the DC/AC bidirectional converter 20 and the accumulator bus 28 of the energy accumulator 18). In steps 408 and 410, a determination may be made as to whether one or more of the energy storage units are functioning properly (e.g. the load controller 19 may determine if any one or more of the energy storage units 24 or 24' are in proper condition for receiving a charge). In steps 412 and/or 414, inoperative ones of the energy storage units may be disconnected from their respective energy storage blocks (e.g., the switches 30 may be activated by the PWM switch controllers 26-2 to disconnect the energy storage units 24 or 24' from the bidirectional DC/DC converters 26-1 of the energy storage blocks 22 or 22'). In steps 416 and 418 power may be stored in the operative ones of the energy storage units (e.g., the switches 30 associated with the operative ones of the energy storage units 24 or 24' may remain closed while power is transferred through from the accumulator bus 28 through the respective bidirectional DC/DC converters 26-1).

In a step 420, power demand from the energy accumulator may be determined (e.g., a power demand signal 19-1 may be transmitted to the load controller 19). In steps 422 and 424, a determination may be made as to whether one or more of the energy storage units are functioning properly (e.g. the load controller 19 may determine if any one or more of the energy storage units 24 or 24' are in proper condition for discharging power). In steps 426 and/or 428, inoperative ones of the energy storage units may be disconnected from their respective energy storage blocks (e.g., the switches 30 may be activated by the PWM switch controllers 26-2 to disconnect the energy storage units 24 or 24' from the bidirectional DC/DC converters 26-1 of the energy storage blocks 22 or 22'). In a step 430 power output from the operative energy storage units may be allocated and delivered to the electrical loads (e.g., the load controller 19 may send load distribution signals 19-3 to the PWM switch controllers 26-1 so that the switches 30 associated with the operative ones of the energy storage units 24 operate with duty cycles consistent with a desired allocation of power).

It should be understood, of course, that the foregoing relates to exemplary embodiments of the invention and that modifications may be made without departing from the spirit and scope of the invention as set forth in the following claims.

We claim:
1. A power management system comprising:
    a generative power source;
    a main bus between the generative power source and electrical loads;
    an energy accumulator including a plurality of energy storage blocks connected to an accumulator bus; and
    a main bidirectional power converter interposed between the main bus and the energy accumulator,
    wherein each of the energy storage blocks includes:
        an energy storage unit;
        a control unit including a dedicated DC/DC bidirectional power converter, a current sensor, and a switch controller;
        a switch interposed between the DC/DC bidirectional converter and the energy storage unit; and
        an inductor interposed between the DC/DC bidirectional converter and the accumulator bus,
        wherein the current sensor is connected across the inductor and connected to the switch controller such that the switch controller opens the switch in the event of current-related overcharge or over-discharge of the energy storage unit.

2. The power management system of claim 1 wherein the storage units store electrical energy at a voltage different from a voltage at which the accumulator supplies voltage to the main bidirectional power converter.

3. The power management system of claim 1 further comprising:
    a DC bus;
    wherein the main bidirectional power converter is connected to the DC bus; and
    wherein the energy accumulator is connected to the DC bus.

4. The power management system of claim 3, wherein:
    the energy storage blocks are connected in parallel to the accumulator bus; and
    the accumulator bus is connected to the DC bus.

5. The power management system of claim 1 wherein at least one of the storage units comprises supercapacitors.

6. An accumulator for electrical energy comprising:
    an accumulator bus;
    a plurality of energy storage blocks connected in parallel to the accumulator bus, each energy storage block including:
        an energy storage unit;
        a control unit including a DC/DC bidirectional converter, a current sensor, and a switch controller;
        a switch interposed between the DC/DC bidirectional converter and the energy storage unit; and
        an inductor interposed between the DC/DC bidirectional converter and the accumulator bus,
        wherein the current sensor is connected across the inductor and connected to the switch controller such that the switch controller opens the switch in the event of current-related overcharge or over-discharge of the energy storage unit.

7. The accumulator of claim 6,
    wherein the control unit includes a voltage sensor interposed between the energy storage unit and the switch controller such that the switch controller can open the switch in the event of voltage-related overcharge or over-discharge of the energy storage unit.

8. The accumulator of claim 6 wherein the control unit of each energy storage block includes a voltage sensor interposed between the energy storage unit and the switch controller such that the switch controller opens the switch in the event of voltage-related overcharge or over-discharge of the energy storage unit.

9. The accumulator of claim 6 including a load controller connected to one or more of the switch controllers such that the load controller allocates a desired portion of a load demand to desired ones of the energy storage blocks.

10. The accumulator of claim 9:
wherein the switch controllers are pulse width modulation (PWM) controllers;
wherein the switches are solid state switches; and
wherein allocation of demand is established by establishing duty cycles of the switches.

11. A method for operating a power management system comprising:
generating electrical power;
supplying the generated power to a energy accumulator;
allocating storage portions of the supplied power to one or more energy storage blocks of the accumulator;
storing the allocated storage portions of supplied power in the energy storage blocks as stored power;
allocating discharging portions of the stored power among one or more of the energy storage blocks; discharging the allocated discharging portions of the stored power to electrical loads;
sensing current passing through dedicated inductors of energy storage units of the energy storage blocks; and
disconnecting one or more of the energy storage units from their respective energy storage blocks to deactivate the energy storage blocks whenever overcharge or over-discharging produces excessive current through the inductor.

12. The method of claim 11 further comprising the step of determining operability of one or more of the energy storage blocks prior to storing a portion of the generated power to the energy storage block.

13. The method of claim 11 further comprising the step of determining operability of one or more of the energy storage blocks prior to discharging a portion of the stored power from the energy storage block.

14. The method of claim 11 further comprising the steps of:
determining operability of one or more of the energy storage blocks prior to storing a portion of the generated power to the energy storage block; and
determining operability of one or more of the energy storage blocks prior to discharging a portion of the stored power from the energy storage block.

15. The method of claim 11 further comprising the steps of:
sensing voltage of outputs of energy storage units of the energy storage blocks;
disconnecting any one or more of the energy storage units from their respective energy storage blocks whenever overcharge or over-discharging produces excessive output voltage.

16. The method of claim 11, including allocating power demand of the energy accumulator to those energy storage blocks that are not deactivated.

* * * * *